March 11, 1941.  A. T. ROBERTS, JR  2,234,280
FEEDER FOR TEXTILE PREPARING MACHINERY
Filed Feb. 12, 1940  2 Sheets-Sheet 2
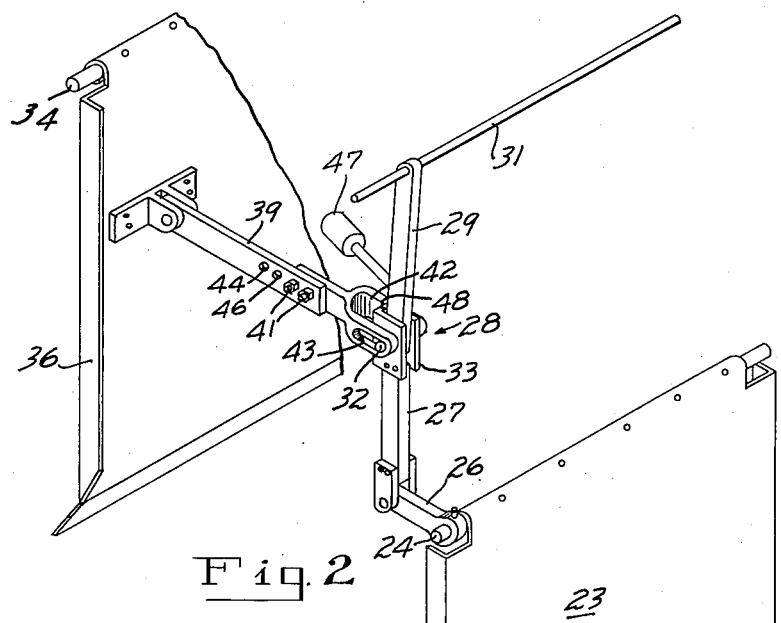
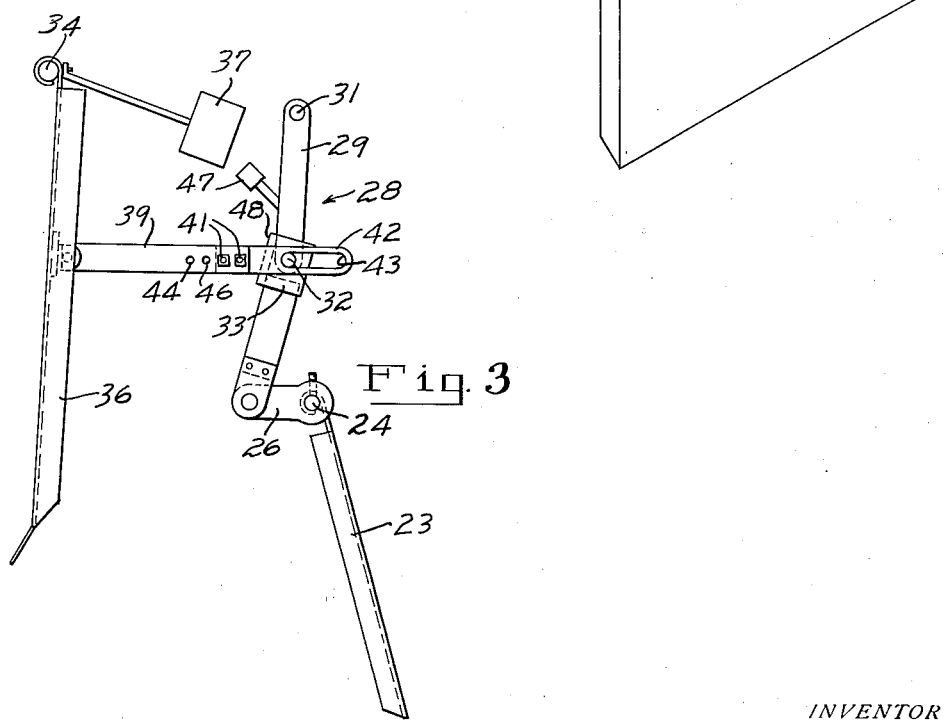
INVENTOR
ALVIN T. ROBERTS, Jr.
BY
Johnston & Jennings
ATTORNEYS Patented Mar. 11, 1941

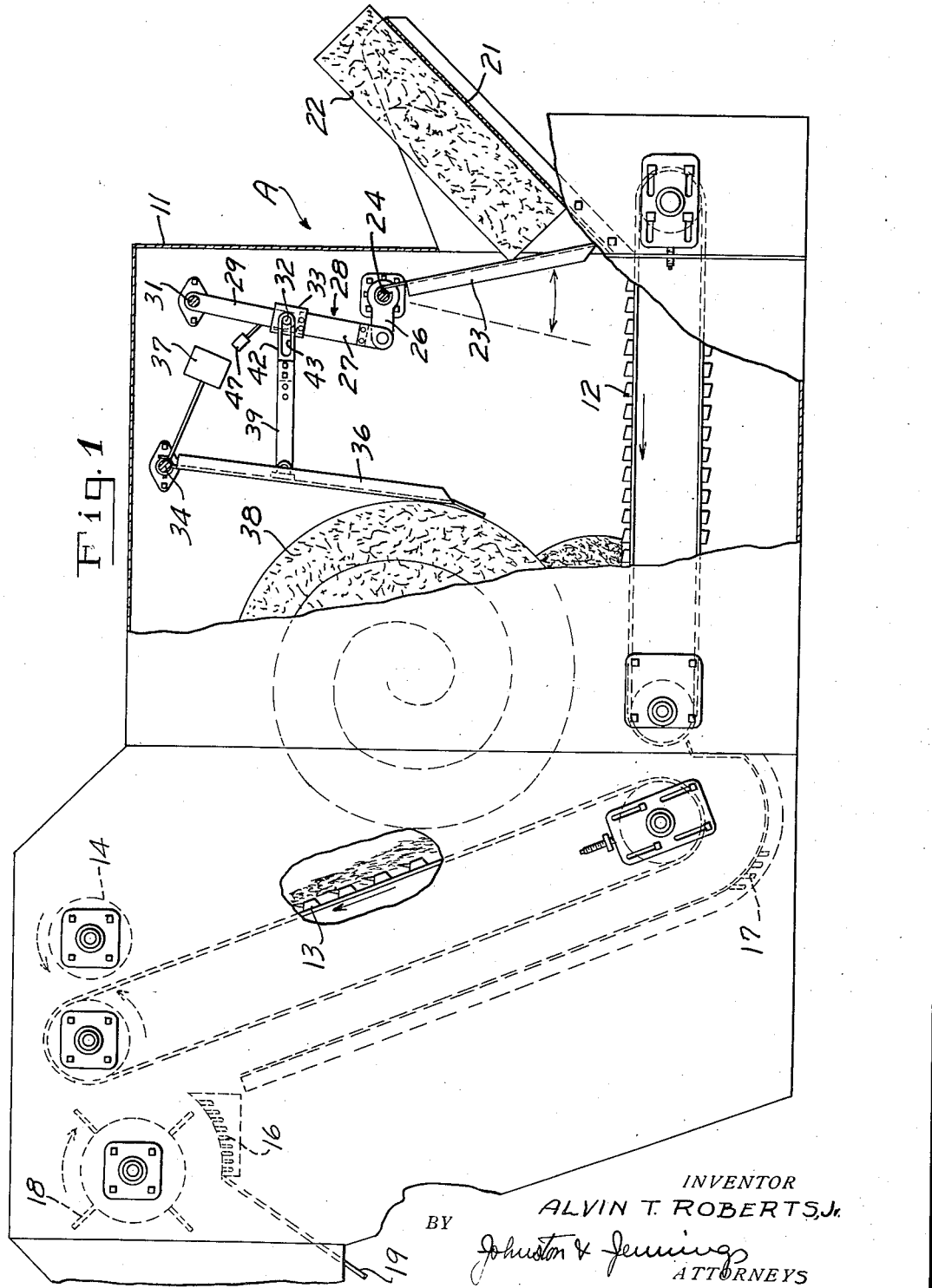

2,234,280

UNITED STATES PATENT OFFICE 2,234,280

FEEDER FOR TEXTILE PREPARING MACHINERY

Alvin T. Roberts, Jr., Columbus, Ga., assignor to Lummus Cotton Gin Company, a corporation of Georgia Application February 12, 1940, Serial No. 318,443

7 Claims. (Cl. 19—69)

This invention relates to a feeder for textile preparing machinery, and has for its principal objects the provision of apparatus of the character designated which shall afford effective opening and cleaning of the cotton or other fibrous material, and which shall embody an improved feed control whereby overloading is prevented.

A further object of the invention is the provision of a cotton feeder embodying a feed control mechanism which shall be effective to prevent the entry of cotton thereinto when no cotton is needed and which shall afford a visual indication when cotton is needed.

A still further object of my invention is to provide a cotton feeder embodying a door controlling the entry of cotton into the feeder casing and operating mechanism for the door effective to hold it fully closed except when cotton is needed.

My invention is employed with a well known type of feeder embodying a feed apron or conveyor and a loosening and cleaning apron. I provide a downwardly inclined feed chute on which a slab of cotton is placed to slide onto the feed apron. Between the chute and the apron is a door controlled by a toggle mechanism adapted to hold the door locked in its closed position. The toggle mechanism in turn is operated by means of a feeler adapted to bear against and move responsive to the size of the mass of cotton in the feeder casing. An adjustable link connects the feeler and the toggle mechanism with a lost motion connection whereby the size of the mass of cotton being treated may be varied.

These and other features of my invention are illustrated in the accompanying drawings made a part of this specification, in which Fig. 1 is a side elevation of a feeder made in accordance with my invention, with parts broken away to illustrate the feed control mechanism;

Fig. 2 is a perspective view of the feed control mechanism removed from the casing and showing the feed door about to open; and Fig. 3 is a side elevation of the same removed from the casing, and with feed door in locked position.

Referring to the drawings, I show a cotton feeder embodying a casing 11, within which is a feed apron 12. At the inner end of the feed apron 12 and upwardly inclined with respect thereto, is a spiked loosening and cleaning apron 13. A stripper roller 14 is placed adjacent the top of the lifting apron and serves to strip from the apron 13 all but a predetermined amount of cotton. Upper and lower cleaning grids 16 and 17 serve to remove dirt and other foreign matter from the cotton, the upper grid 16 cleaning that portion of the cotton removed from the lifting apron by a doffing roller 18, and the lower grid 17 cleaning the cotton which remains on the downcoming side of the lifting apron. A cotton outlet slide 19 is positioned adjacent the upper grid 16 and affords an exit for the cleaned, loosened cotton. The above construction is well known in the art of cotton cleaning and requires no further detailed description here.

I provide the feed end A of the cleaner with a cotton inlet slide 21 adapted to receive slabs 22 from a bale of cotton. The lower ends of the slabs 22 rest against a feed door 23, fixedly mounted on a pivotal shaft 24, whenever the door is in closed position, as indicated in full lines in Fig. 1. The inclination of the slide 21 is such that the slab 22 tends to push the door open, and if the door is unlocked, as will be more fully explained, the weight of the slabs (generally from 15 to 25 pounds) pushes the door open and the slabs fall onto the feed apron 12.

Rigidly secured to the shaft 24 is an arm 26 which is pivotally connected to the lower member 27 of a toggle joint 28. The upper member 29 of the toggle joint 28 is pivotally mounted within the casing 11 on a shaft 31, and is pivotally connected by a pin 32 to a cuff 33 fast on the upper end of the lower toggle member 27.

Mounted fast on a pivotal transverse shaft 34 is a feeler 36 which may be formed from a metal sheet of proper size and which is biased by a weight 37 toward the loosening and cleaning apron 13, so that when the machine is supplied with cotton the feeler 36 bears against the roll of cotton 38 formed between the two aprons, provided the roll is of a predetermined size. It will readily be seen that the feeler 36 swings toward and away from the feed door 23 responsive to increases and decreases, respectively, of the size of roll 38.

In order to open and close the feed door 23 responsive to changes in the roll size, I pivotally secure to the feeler 36 a link 39 having secured to its other end by bolts 41 a yoke member 42 having therein a slot 43. The yoke is adapted to slidably fit about the cuff 33 and is held in position by the pin 32. Additional bolt holes 44 and 46 are provided in the member 39 so that effective length of the connector may be varied in order to maintain a larger or smaller size of roll in the machine.

In the particular embodiment of my invention illustrated in the drawings, the feed door 23 is fully closed when it hangs slightly past a vertical plane through the center of its pivot shaft 24. I have found, therefore, that a small weight 47, secured to member 29, is necessary to counterbalance the toggle joint 28 and cause it to swing past dead center, as shown in Fig. 3.

It will be noted that whenever the toggle joint is broken to the right, as shown in Fig. 3, it is past dead center and the feed door is securely locked in fully closed position. In locked position the wall 48 of the cuff 33 bears against the upper toggle member 29, and prevents further movement of the joint to the right.

The operation of my improved feeder is as follows: Assuming that the machine is empty and the feed door 23 in open position; the slotted yoke 42 will have broken the toggle joint to the left, as seen in Fig. 2, and, due to the weight 37, will have pulled the arm 26 upwardly, thus opening the door. The operator places a slab of cotton 22 on the feed slide 21, and, because the door is open, the slab immediately slides onto the feed apron 12. The slab rides on the feed apron into contact with the loosening and cleaning apron 13, whereupon the roll 38 begins to form, due to pulling action of the loosening apron 13 on the slab 22, and the stripping action of roller 14. As soon as the roll becomes large enough to contact the pivoted feeler 36, and continues to grow larger from additional slabs of cotton, the feeler 36 moves to the right, thus allowing the door to approach nearer its closed position. When the slabs 22 have provided enough cotton to form a roll 38 of a predetermined size, the yoke 42 rides to the right over pin 32, until the left hand end of slot 43 pushes against the pin, whereupon the toggle is broken to the right and the upper toggle member 29 bears against the upper end 48 of the cuff 33, as seen in Fig. 3, thus locking the feed door 23 in fully closed position. The operator, seeing that the door is closed, places another slab of cotton on the slide 21 with its end resting against the feed door 23. As the roll 38 decreases in size, responsive to a removal of cotton therefrom by the apron 13, the feeler 36 moves to the left from the position seen in Fig. 1, yoke 42 rides over pin 32 until the right hand end of slot 43 bears against the pin 32. As the roll 38 continues to decrease, the yoke 42, moving further to the left responsive to the weight 37, breaks the toggle to the left, from the position seen in Fig. 1, whereupon the weight of the slab 22 pushes the door open, the pin 32 being then free to slide to the left hand end of the slot 43, as viewed in the drawings, and the slab 22 falls onto the feed apron 12, whereupon the cycle is repeated.

Inasmuch as there is no stop to limit the movement of the toggle joint to the left from the position shown in Fig. 1, the weight of the slab 22 and the action of the feed apron 12 effect sufficient opening of the door 23 for entry of the slab.

From the foregoing it will be seen that it is impossible to overload my improved cleaner, for the feed door 23 is never open except at the time when the machine is ready to be fed. Furthermore, it is not necessary for the operator to calculate by timing or otherwise, whether the machine needs to be fed, as all that is necessary for him to do is to place a slab on the inlet slide whenever the feed door 23 is closed, and there is no slab on the slide.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a cotton feeder embodying a casing having a side opening, a horizontally disposed feed apron and a spiked upwardly inclined cleaning and loosening apron in the casing disposed to receive cotton from the feed apron, a door pivotally mounted to hang downwardly in front of the opening and controlling the entry of cotton into the casing, a downwardly inclined slide in front of the door for receiving a slab of cotton to enter the casing when needed, a pivoted feeler member in the casing and disposed adjacent the mass of cotton being acted upon by the aprons, and a link and toggle mechanism connecting the feeler with the door to control the opening and closing thereof.

2. In a cotton feeder embodying a casing having a side opening, a horizontally disposed feed apron and a spiked upwardly inclined cleaning and loosening apron in the casing positioned to receive the cotton from the feed apron, a door pivoted to hang downwardly in front of the opening over the feed apron, a downwardly inclined slide in front of the door for receiving a slab of cotton and delivering it into the casing, a pivoted feeler member hanging downwardy in the casing to the rear of the door and disposed adjacent the mass of cotton being acted upon by the aprons, a toggle mechanism controlling the opening and closing of the door, and a link connecting the feeler and the toggle mechanism and effective to open the door when a predetermined minimum mass of cotton is in the casing.

3. In a cotton feeder embodying a casing, a feed apron and a spiked upwardly inclined cleaning and loosening apron in the casing, a door controlling the entry of cotton into the casing, a slide in front of the door for receiving a slab of cotton to enter the casing when needed, a pivoted feeler member in the casing and disposed adjacent the mass of cotton being acted upon by the aprons, a toggle mechanism controlling the opening and closing of the door, a link connecting the feeler and the toggle mechanism and effective to open the door when there is a predetermined minimum mass of cotton in the casing, means embodied in said toggle mechanism to limit the closing movement of the door and hold it closed when the mass of cotton in the casing is above said predetermined minimum, and a lost motion connection between the link and the toggle mechanism permitting a predetermined movement of the feeler in a direction to open the door before said door is opened.

4. In a cotton feeder embodying a casing, a feed apron in the casing, a lifting apron in the casing, and a roll of cotton between the two aprons, the combination of a feed door opening onto said feed apron, a downwardly inclined cotton slide adjacent the feed door, a pivoted feeler biased toward the roll of cotton and movable responsive to changes in the roll size, and a toggle joint associated with said feed door and feeler to open the door when broken in one direction and to lock it in closed position when broken in the opposite direction.

5. In a cotton feeder embodying a casing, a feed apron in the casing, a lifting apron in the casing, and a roll of cotton between the two aprons, the combination of a feed door opening onto said feed apron, a downwardly inclined cotton slide adjacent the feed door, a pivoted feeler biased toward the roll of cotton and movable responsive to changes in the roll size, a toggle joint associated with said feed door and feeler to open the door when broken in one direction and to lock it in closed position when broken in the opposite direction, and a lost motion connection between the feeler and the toggle joint.

6. In a cotton feeder embodying a casing, a feed apron, and a lifting apron upwardly inclined to the feed apron and disposed within the casing, the combination of a door to admit cotton to the feed apron, a downwardly inclined cotton feed slide adjacent the door, a roll of cotton formed between the feed apron and the lifting apron, a pivoted feeler bearing against the roll of cotton, a toggle joint by which the feed door is opened and closed and locked in closed position, a link connecting the pivoted feeler to the toggle joint to open the feed door when the toggle is broken responsive to a predetermined minimum size of said roll, and a lost motion connection between the link and the toggle joint.

7. In a cotton feeder embodying a casing, a feed apron and a lifting apron upwardly inclined to the feed apron and disposed within the casing, the combination of a door to admit cotton to the feed apron, a downwardly inclined cotton feed slide adjacent the door, a roll of cotton formed between the feed apron and the lifting apron, a pivoted feeler bearing against the roll of cotton, a toggle joint by which the feed door is opened and closed and locked in closed position, a link connecting the pivoted feeler to the toggle joint to open the feed door when the toggle is broken responsive to a predetermined minimum size of said roll, a lost motion connection between the link and the toggle joint, and means to adjust the length of the link to regulate the minimum and maximum size of the mass of cotton to be treated in the casing.

ALVIN T. ROBERTS, Jr.